United States Patent
Zeng

(10) Patent No.: US 10,579,386 B2
(45) Date of Patent: *Mar. 3, 2020

(54) MICROPROCESSOR FOR GATING A LOAD OPERATION BASED ON ENTRIES OF A PREDICTION TABLE

(71) Applicant: Intel Corporation, Santa Clara, CA (US)

(72) Inventor: Hui Zeng, Cupertino, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/217,628

(22) Filed: Dec. 12, 2018

(65) Prior Publication Data

US 2019/0114174 A1 Apr. 18, 2019

Related U.S. Application Data

(63) Continuation of application No. 14/063,173, filed on Oct. 25, 2013, now Pat. No. 10,198,265.

(Continued)

(51) Int. Cl.
*G06F 9/38* (2018.01)
*G06F 9/30* (2018.01)

(52) U.S. Cl.
CPC ........ *G06F 9/3834* (2013.01); *G06F 9/30043* (2013.01); *G06F 9/3826* (2013.01)

(58) Field of Classification Search
CPC .................................................. G06F 9/3834
See application file for complete search history.

(56) References Cited

U.S. PATENT DOCUMENTS 5,651,124 A 7/1997 Shen et al.
5,651,125 A 7/1997 Witt et al.
(Continued)

FOREIGN PATENT DOCUMENTS

TW 201250583 A 12/2012

OTHER PUBLICATIONS

Advisory Action from U.S. Appl. No. 14/063,409, dated Jul. 19, 2018, 6 pages.

(Continued)

*Primary Examiner* — Keith E Vicary
(74) *Attorney, Agent, or Firm* — Nicholson De Vos Webster & Elliott LLP

(57) ABSTRACT

An apparatus for gating a load instruction is presented. The apparatus includes a memory to store a prediction table including an entry matching the load instruction. The matching entry includes a tag field to identify the load instruction, a distance field to indicate a distance of the load instruction to a prior aliasing store instruction, and a confidence field to indicate a prediction strength. The apparatus further includes a gating circuit operable to perform a look-up for the load instruction in the prediction table to find the matching entry and responsive to a determination of a valid prediction, retrieve a location of the prior aliasing store instruction using a value of the distance field of the matching entry, and perform a gating operation on the load instruction. The apparatus further includes a load store queue operable to provide feedback for updating the matching entry after the load instruction has executed.

20 Claims, 14 Drawing Sheets

Related U.S. Application Data

(60) Provisional application No. 61/793,466, filed on Mar. 15, 2013.

(56) References Cited

U.S. PATENT DOCUMENTS

| | | | |
|---|---|---|---|
| 5,987,595 | A | 11/1999 | Yoaz et al. |
| 7,181,598 | B2 | 2/2007 | Jourdan et al. |
| 7,434,031 | B1 | 10/2008 | Spracklen et al. |
| 7,734,895 | B1 | 6/2010 | Agarwal et al. |
| 8,099,566 | B2 | 1/2012 | Luttrell |
| 8,438,334 | B2 | 5/2013 | Bell, Jr. et al. |
| 8,769,241 | B2 | 7/2014 | Chiang et al. |
| 8,832,354 | B2 | 9/2014 | Sokolov et al. |
| 10,152,327 | B2 * | 12/2018 | Zeng .................. G06F 9/30043 |
| 10,198,265 | B2 * | 2/2019 | Zeng .................. G06F 9/30043 |
| 2002/0042863 | A1 | 4/2002 | Jeddeloh |
| 2009/0049234 | A1 | 2/2009 | Oh et al. |
| 2010/0153690 | A1 | 6/2010 | Vick et al. |
| 2010/0268893 | A1 | 10/2010 | Luttrell |
| 2010/0274973 | A1 | 10/2010 | Balakrishnan et al. |
| 2011/0153307 | A1 | 6/2011 | Winkel et al. |
| 2011/0231593 | A1 | 9/2011 | Yasufuku et al. |
| 2014/0281384 | A1 | 9/2014 | Zeng |
| 2014/0281408 | A1 | 9/2014 | Zeng |

OTHER PUBLICATIONS

Final Office Action from U.S. Appl. No. 14/063,173, dated Apr. 6, 2018, 43 pages.
Final Office Action from U.S. Appl. No. 14/063,173, dated Feb. 16, 2017, 15 pages.
Final Office Action from U.S. Appl. No. 14/063,409, dated Apr. 6, 2018, 44 pages.
Final Office Action from U.S. Appl. No. 14/063,409, dated Feb. 15, 2017, 16 pages.
Mutlu, O., "Memory Dependence Prediction and Access Ordering for Memory Disambiguation and Renaming," EE 382N (Superscalar Microprocessor Architecture) Literature Survey, University of Texas at Austin, Oct. 2001, 16 pages.
Non-Final Office Action from U.S. Appl. No. 14/063,173, dated Jul. 14, 2016, 49 pages.
Non-Final Office Action from U.S. Appl. No. 14/063,173, dated Nov. 22, 2017, 52 pages.
Non-Final Office Action from U.S. Appl. No. 14/063,409, dated Jul. 14, 2016, 49 pages.
Non-Final Office Action from U.S. Appl. No. 14/063,409, dated Nov. 22, 2017, 52 pages.
Notice of Allowance from U.S. Appl. No. 14/063,173, dated Sep. 28, 2018, 13 pages.
Notice of Allowance from U.S. Appl. No. 14/063,409, dated Sep. 4, 2018, 5 pages.

* cited by examiner

| Cycle 1 | Cycle 4 | Cycle 2 | Cycle 3 |
|---|---|---|---|
| Insn 1 | Insn 2 | Insn 3 | Insn 4 |
| Add r2 r1, r9 | Str [r7(0x4000) r2 (0x1) | Ldr r9 [r8(0x4000)] | Sub r1 r9, r14 |
| ↑ 257 | ↑ 258 | ↑ 259 | ↑ 260 |

FIG. 2

LSAP

| Valid 757 | Tag 758 | StoreDelta 759 | ConfCount 760 |
|---|---|---|---|
| 1 | 0x1000 | 4 | 1 |
| 1 | 0x2000 | 5 | 2 |
| 1 | 0x3000 | 6 | 3 |
| 1 | 0x4000 | 7 | 2 |
| 0 | 0x0 | 0 | 0 |
| 1 | 0x5000 | 8 | 1 |
| 1 | 0x6000 | 9 | 1 |

FIG. 7

| Valid | Composite Tag 1172 | StoreDelta 1173 | ConfCount 1174 |
|---|---|---|---|
| 1 | 0x1000 | 4 | 1 |
| 1 | 0x2000 | 5 | 2 |
| 1 | 0x3000 | 6 | 3 |
| 1 | 0x4000 | 7 | 2 |
| 0 | 0x0 | 0 | 0 |
| 1 | 0x5000 | 8 | 1 |
| 1 | 0x6000 | 9 | 1 |

1171

| PC | Last Store Delta | THID |
|---|---|---|
| 1180 | 1181 | 1182 |

| PC | instruction |
|---|---|
| 10 | Store [%r2(0x4000)] %r4 (0x8000) |
| ... | ... |
| 14 | Add %r3 %r8, %r9 |
| ... | ... |
| 16 | Store [%r2(0x8000)] %r5 (0x6000) |
| ... | ... |
| 20 | Load %r2 [%r2(0x4000)] |

FIG. 13

MICROPROCESSOR FOR GATING A LOAD OPERATION BASED ON ENTRIES OF A PREDICTION TABLE

CROSS-REFERENCE TO RELATED APPLICATIONS

This application is a continuation of U.S. application Ser. No. 14/063,173, filed Oct. 25, 2013 (now U.S. Pat. No. 10,198,265, issued Feb. 5, 2019), which claims the benefit of U.S. Provisional Application No. 61/793,466, filed Mar. 15, 2013, which is hereby incorporated by reference.

This application is related to U.S. application Ser. No. 14/063,409 filed Oct. 25, 2013 (now U.S. Pat. No. 10,152,327 issued Dec. 11, 2018), which also claims the benefit of U.S. Provisional Application No. 61/793,466 filed Mar. 15, 2013, which are hereby incorporated by reference.

FIELD OF INVENTION

Embodiments according to the present invention generally relate to microprocessor architecture and more particularly to the architecture for out-of-order microprocessors.

BACKGROUND OF THE INVENTION

In an Out-Of-Order ("OOO") microprocessor, instructions are allowed to issue and execute out of their program order. For example, the scheduler in an OOO processor can issue and execute a load before a previous store writes to the same memory location. Memory dependencies can therefore exist between such a load and a prior store that needs to access the same memory address. The OOO machine typically needs to address the errors that result from a load returning wrong data because it attempts to access a memory location before a prior occurring store has written to the same memory location. This type of error is known as a memory read-after-write (RAW) violation. Further, the load and store pair is typically referred to as "aliasing" because it is targeting the same memory address.

FIGS. 1A-1C illustrate certain typical problems that can arise as a result of out-of-order execution of loads and stores in an OOO machine. FIG. 1A shows that a later load instruction 152 loads data from the same memory address [0x4000] 153 that is referenced in a previous store instruction. Accordingly, the load 152 should store the same value in register r3 as that stored in register r5 by store instruction 151. As shown in FIG. 1B, if the load instruction 152 is executed before the store, it will load incorrect data. This is known as a RAW violation as indicated above. In order to recover from the violation, the pipeline will need to be flushed and the load instruction along with other instructions dependent on it will need to re-execute. Because of the high computational penalty of a flush operation, it is important to avoid this kind of re-execution from happening in a high performance CPU.

Another type of common problem that results from out-of-order execution of loads and stores is a read-after-write (RAW) delay. FIG. 1C illustrates a load instruction 152 that is executed after store instruction 151, but the store instruction 151 is blocked by a long latency memory access resulting from load instruction 162. This results in a RAW delay.

A store has both store address (SA) and store data (SD) components. It is possible a SA, e.g., [0x4000] as shown in FIG. 1C can be issued well before a SD, e.g., r5 in FIG. 1C, because the SD is waiting for another register source to be ready, e.g., r5 from load instruction 162. Store instruction 151 cannot execute until the proper value is loaded into register r5 by load instruction 162. It is, therefore, important to avoid executing load 152 while store instruction 151 is waiting on load instruction 162 so that resources in the pipeline, e.g., the load store queue (LSQ) can be used by other loads which do not have to wait.

FIG. 2 illustrates a more detailed example of how a conventional OOO microprocessor handles a memory read-after-write ("RAW") violation. Instruction 1 257, Instruction 2 258, Instruction 3 259, and Instruction 4 260 are in program order. However, in an OOO machine, Instruction 3 259, the load instruction, can execute during cycle 2 before Instruction 2 258, which is a store instruction that executes in cycle 4 and accesses the same memory location [0x4000] as the load instruction 259. If load instruction 259 executes in a prior cycle from the store instruction 258, it will get wrong data from memory location [0x4000]. Accordingly, the wrong data will be stored in register r9 by load instruction 259. Further, Instruction 4 260 may execute in cycle 3 using the wrong data from the load instruction 259.

In order to correct the errors resulting from this RAW violation, both instructions 259 and 260 are invalidated and need to re-execute following a pipeline flush. The load instruction 259 will receive the correct data from the store instruction 258 during the re-execution, however, a severe computational penalty is paid in order to perform the pipeline flush and re-execution.

Conventional methods of addressing the issues associated with RAW violations are problematic because, as will be explained in connection with FIG. 3, they have no way of tracking explicit dependence information between loads and their aliasing stores and, accordingly, result in unnecessary delays. Further, conventional OOO microprocessors lack any effective means of preventing memory RAW delays. FIG. 3 illustrates an exemplary pipeline for a conventional OOO microprocessor. Instructions are fetched at the fetch stage 302 and placed in the instruction fetch queue (IFQ) (not shown) within fetch stage 302. The instructions are generally the original assembly instructions found in the executable program.

These instructions reference the architectural registers, which are stored in register file 310. If the first fetched instruction was to be interrupted or raise an exception, the architectural register file 310 stores the results of all instructions until that point. Stated differently, the architectural register file stores the state that needs to be saved and restored in order to return back to the program during debugging or otherwise.

In an OOO microprocessor, the instructions execute out of order while still preserving data dependence constraints. Because instructions may finish in an arbitrary order, the architectural register file 310 cannot be modified by the instructions as they finish because it would make it difficult to restore their values accurately in the event of an exception or an interrupt. Hence, every instruction that enters the pipeline is provided a temporary register where it can save its result. The temporary registers are eventually written into the architectural register file in program order. Thus, even though instructions are being executed out of order, the contents of the architectural register files change as though they were being executed in program order.

The ROB 308 can facilitate this process. After the instructions are dispatched from the fetch unit 302, they are decoded by decode module 304 and are placed in the ROB 308 and issue queue 306 (IQ). The ROB 308 and IQ 306 may be part of a scheduler module 372. As scheduler module 372 issues or dispatches instructions out of IQ 306 out of order, they are executed by execute module 312.

The write back module 314, in a conventional OOO micro-architecture will write the resulting values from those instructions back to the temporary registers in ROB 308 first. The ROB 308 keeps track of the program order in which instructions entered the pipeline and for each of these instructions, the ROB maintains temporary register storage. When the oldest instructions in the ROB produce a valid result, those instructions can be safely "committed." That is, the results of those instructions can be made permanent since there is no earlier instruction that can raise a mispredict or exception that may undo the effect of those instructions. When instructions are ready to be committed, the ROB 308 will move the corresponding values in the temporary registers for those instructions to the architectural register file 310. Therefore, through the ROB's in-order commit process, the results in the register file 310 are made permanent and architecturally visible.

The instructions issued out of order from the IQ 306 may also comprise loads and stores. As explained above, when loads and stores are issued out of order from the IQ 306, there are memory dependencies between them that need to be resolved before those instructions can be committed. Accordingly, the load and stores instructions are stored in a Load Store Queue (LSQ) 316 while the dependencies between them are resolved with the help of ROB 308.

Conventional OOO machines handle RAW violations by using, for example, a Store to Load Predictor module 356. Store to Load Predictor module 356 is used to predict data dependencies between loads and previous stores. If a RAW violation takes place, the PC of the problematic load is stored in a table in module 356. Subsequently, if scheduler 372 attempts to issue a load out of order from IQ 306, it will check the table in module 356 to make sure that the PC of the load does not match any entry in the table. If the load does match a prior entry in the table, then the scheduler will ensure that the load is not issued until all stores prior to the load are issued. This is inefficient because not all previous stores will be relevant to a problematic load. Only the stores that access the same memory location (e.g., of memory 318) as the problematic load, e.g., only the aliasing stores need to be issued prior to the load. However, schedulers in conventional OOO processors do not have visibility into the memory locations accessed by the load and store instructions and, therefore, cannot discriminate between the prior stores.

Further, as discussed above, conventional OOO processors lack any effective means of preventing memory RAW delays. To guarantee correctness in the Load Store Queue (LSQ), when a conventional OOO processor finds an aliasing store in the Store Queue (SQ) still in the process of writing data that a problematic load, e.g. instruction 152 in FIG. 1C, wants to read, the LSQ will send a dependent throughput miss to the scheduler for this load, effectively putting this load into sleep state. Subsequently, the LSQ will retry the load once store data is ready. There are obvious performance and power costs associated with these retries. For example, the problematic load 152 will occupy space in the LSQ, which could otherwise have been used by another load that did not have to wait for an aliasing store.

BRIEF SUMMARY OF THE INVENTION

Accordingly, a need exists for a method and apparatus for a more efficient and flexible OOO processor architecture that is configured to prevent memory RAW delays. To reduce the performance and power costs associated with the retries resulting from a memory RAW delay, in one embodiment, the present invention prevents a load from being issued if a prior store, still in flight, is writing the data that load wants to read (store forwarding process).

In one embodiment, the present invention provides for a Load Store Alias Predictor (LSAP) module that can be used to prevent the issuing of a load until its forwarding store becomes ready by adding an artificial dependency from a load to its matching Store Data (SD) and delaying the load until the SD is issued. By making the memory dependence between a load and its forwarding store data visible to the scheduler, the LSAP targets both memory RAW violations and memory RAW delays.

The LSAP is advantageous because it results in better performance. Later instructions including other loads which do not have dependencies can be issued and benefit from a higher level of instruction level parallelism. It also avoids the longer control path latency of retry which requires the LSQ to send a data ready signal to wake up all the instructions dependent on the aliasing load when the forwarding store data becomes ready. Further, the LSAP advantageously saves power by reducing activities associated with retries and increases LSQ resource utilization efficiency.

Further, a need exists for a method and apparatus for a more efficient and flexible OOO processor architecture that prevents memory RAW violations by delaying the issue of a load until a forwarding store has made available the data that the load is expecting. This results in better performance because, unlike conventional OOO processors, in one embodiment, the OOO processor of the present invention will only delay the data from a potentially problematic load to wait for an aliasing store to forward data instead of waiting on all prior occurring stores.

To reduce the cost of repetitive RAW violations from certain load instructions, in one embodiment, the present invention provides for a Load Store Hazard Predictor (LSHP) module. The LSHP can advantageously identify loads that might cause RAW violations based on a prior history of failing to return data written by older stores in the programming order. Further, the LSHP also advantageously delays the loads only when it is necessary to avoid a RAW violation because not all instances associated with the same load instruction result in RAW violations.

Accordingly, both the LSAP and LSHP act in concert to allow for more aggressive memory speculation in an OOO processor while reducing the penalty of a mispredict.

In one embodiment, a microprocessor implemented method for gating a load operation based on entries of a memory resident data structure is disclosed. The method comprises performing a look-up for the load operation in a prediction table to find a matching entry, wherein the matching entry within the prediction table corresponds to a prediction regarding a behavior of the load operation, and wherein the matching entry comprises: (a) a tag field operable to identify the matching entry; (b) a distance field operable to indicate a distance of the load operation to a prior aliasing store instruction; and (c) a confidence field operable to indicate a prediction strength generated by the prediction table, wherein the prediction strength influences a gating of the load operation. The method further comprises determining if the matching entry provides a valid prediction and, responsive to a determination of a valid prediction, retrieving a location for the prior aliasing store instruction using the distance field. It finally comprises performing a gating operation on said load operation.

In another embodiment, a microprocessor implemented method for gating a load operation is disclosed. The method comprises performing a look-up for the load operation in a first memory resident data structure to find a first matching entry, wherein the first memory resident data structure is a first prediction table residing in a scheduler of a microprocessor pipeline. Further, the first matching entry within the first prediction table corresponds to a prediction regarding a dependence of the load operation on a prior aliasing store instruction. Additionally, the first matching entry comprises: (a) a tag field operable to identify the first matching entry in the first prediction table; (b) a distance field operable to indicate a distance of the load operation to the prior aliasing store instruction; and (c) a confidence field operable to indicate a prediction strength generated by the first prediction table, wherein the prediction strength influences a gating of the load operation. The method further comprises determining if the first matching entry provides a valid prediction by comparing the confidence field with a threshold value. Subsequently, responsive to a determination of a valid prediction, the method comprises retrieving a location for the prior aliasing store instruction using the distance field. Finally, the method comprises performing a first gating operation on the load operation, wherein the first gating operation prevents dispatching of the load operation until the prior aliasing store instruction has executed.

In a different embodiment, a microprocessor implemented method for gating a load operation based on entries of a memory resident data structure is disclosed. The method comprises performing a look-up for the load operation in the memory resident data structure to find a matching entry. The memory resident data structure is a prediction table residing in a memory stage of a microprocessor pipeline and the matching entry within the prediction table corresponds to a prediction regarding a dependence of the load operation on a prior forwarding store instruction. The matching entry comprises: (a) a tag field operable to identify the matching entry in the prediction table; (b) a distance field operable to indicate a distance of the load operation to a prior aliasing store instruction; and (c) a confidence field operable to indicate a prediction strength generated by the prediction table, wherein the prediction strength influences a gating of the load operation. The method further comprises determining if the matching entry provides a valid prediction by comparing the confidence field with a threshold value. Subsequently, responsive to a determination of a valid prediction, the method comprises retrieving a location for the prior aliasing store instruction using the distance field. Finally, the method comprises performing a gating operation on the load operation, wherein the gating operation delays a data return of the load operation, and wherein the load operation is delayed until the prior forwarding store instruction forwards data to the load operation.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

FIG. 2 illustrates a more detailed example of how a conventional OOO microprocessor handles a memory read-after-write violation.

FIG. 7 is an exemplary diagram of a Load Store Alias Predictor ("LSAP") in accordance with one embodiment of the present invention.

FIG. 13 illustrates how the StoreDelta parameter is used in conjunction with the composite tag parameter in a LSHP in accordance with one embodiment of the present invention.

DETAILED DESCRIPTION OF THE INVENTION

Figure 1A:
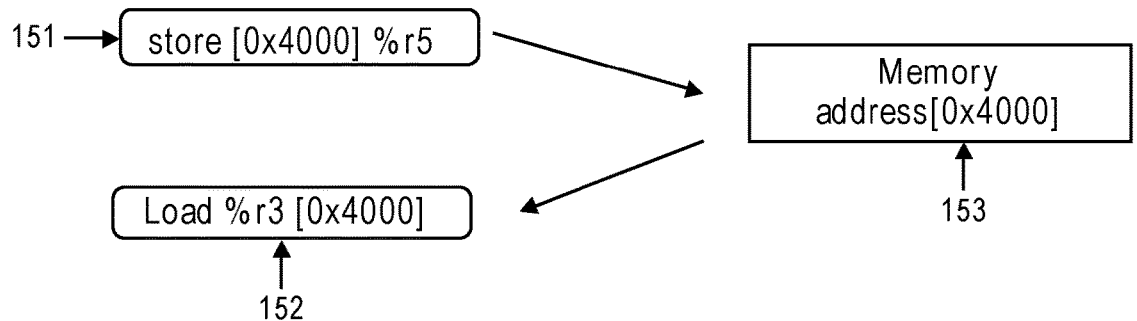
FIGS. 1A-1C illustrate certain typical problems that can arise as a result of out-of-order execution of loads and stores in an OOO machine.
Figure 1B:
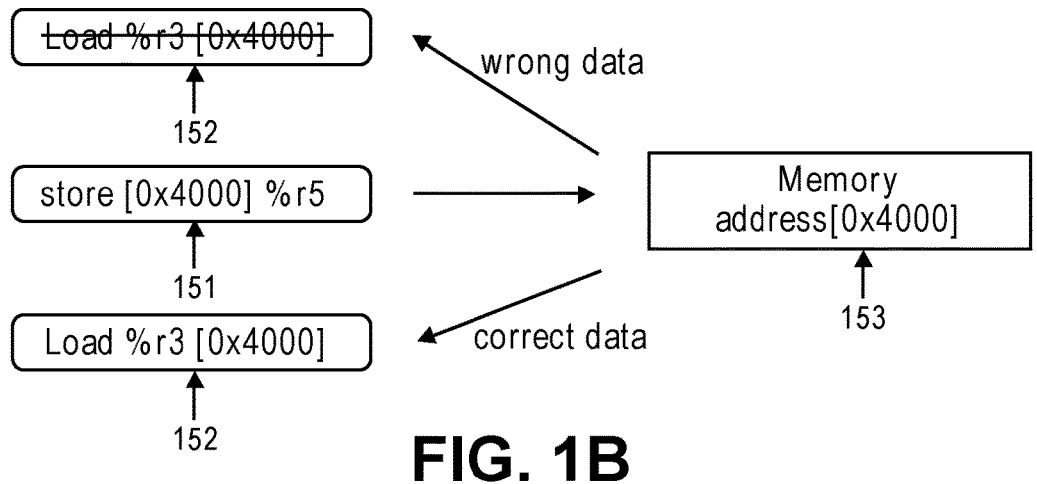
Figure 1C:
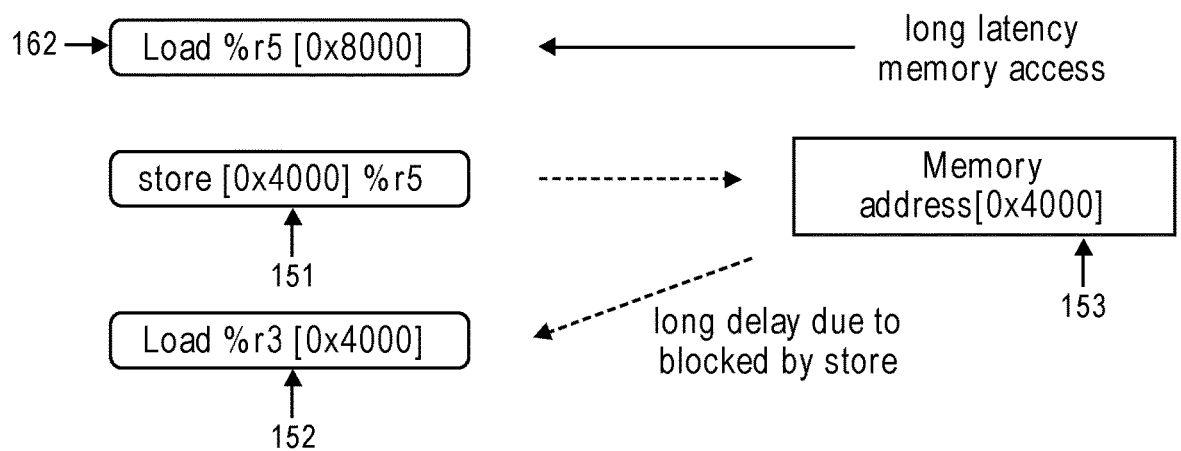
Figure 3:
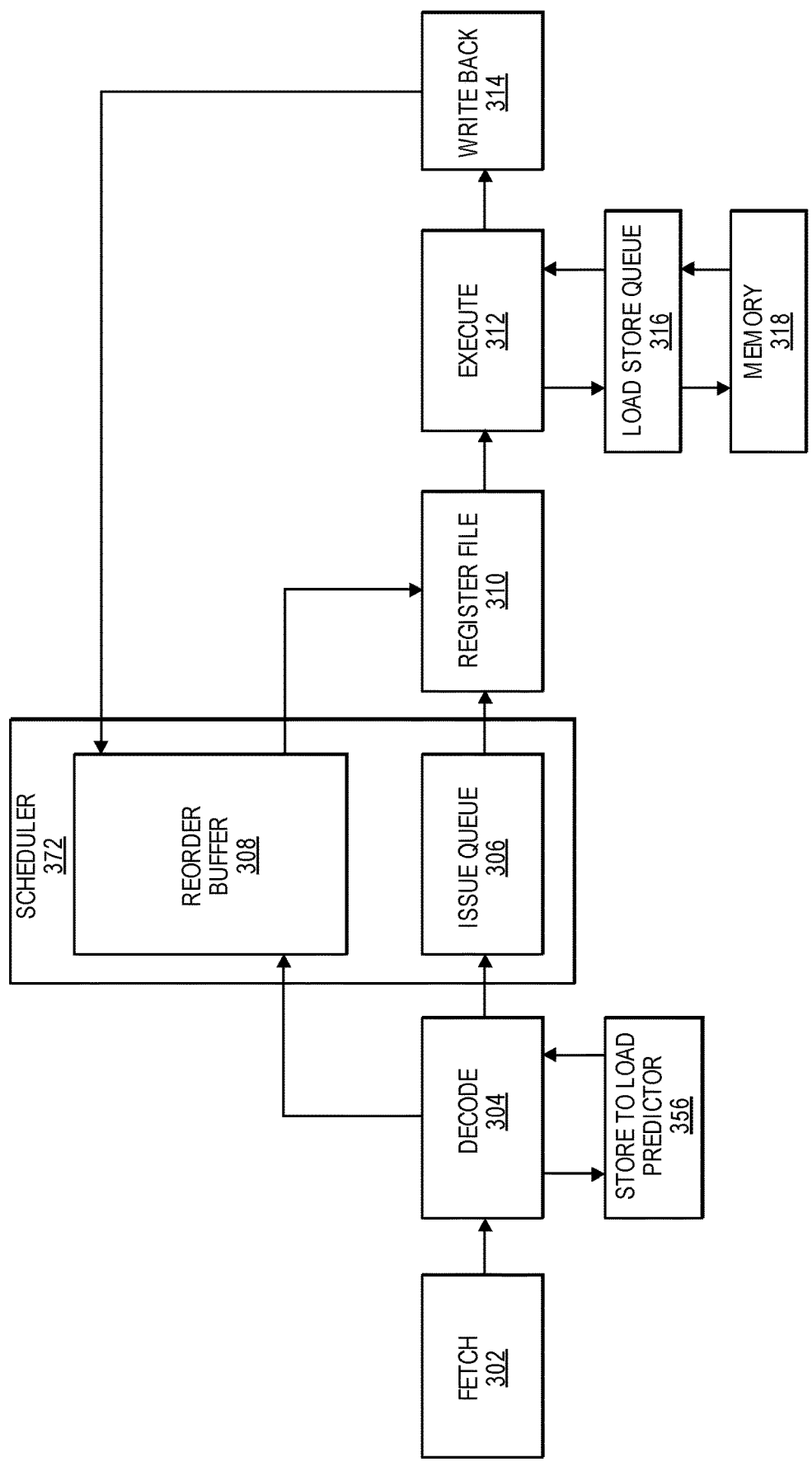
FIG. 3 illustrates an exemplary pipeline for a conventional OOO microprocessor.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "performing," "retrieving," "gating," "presenting," "determining," "identifying," or the like, refer to actions and processes (e.g., flowchart 1400 of FIG. 14) of a computer system or similar electronic computing device or processor (e.g., system 410 of FIG. 4). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Figure 4:
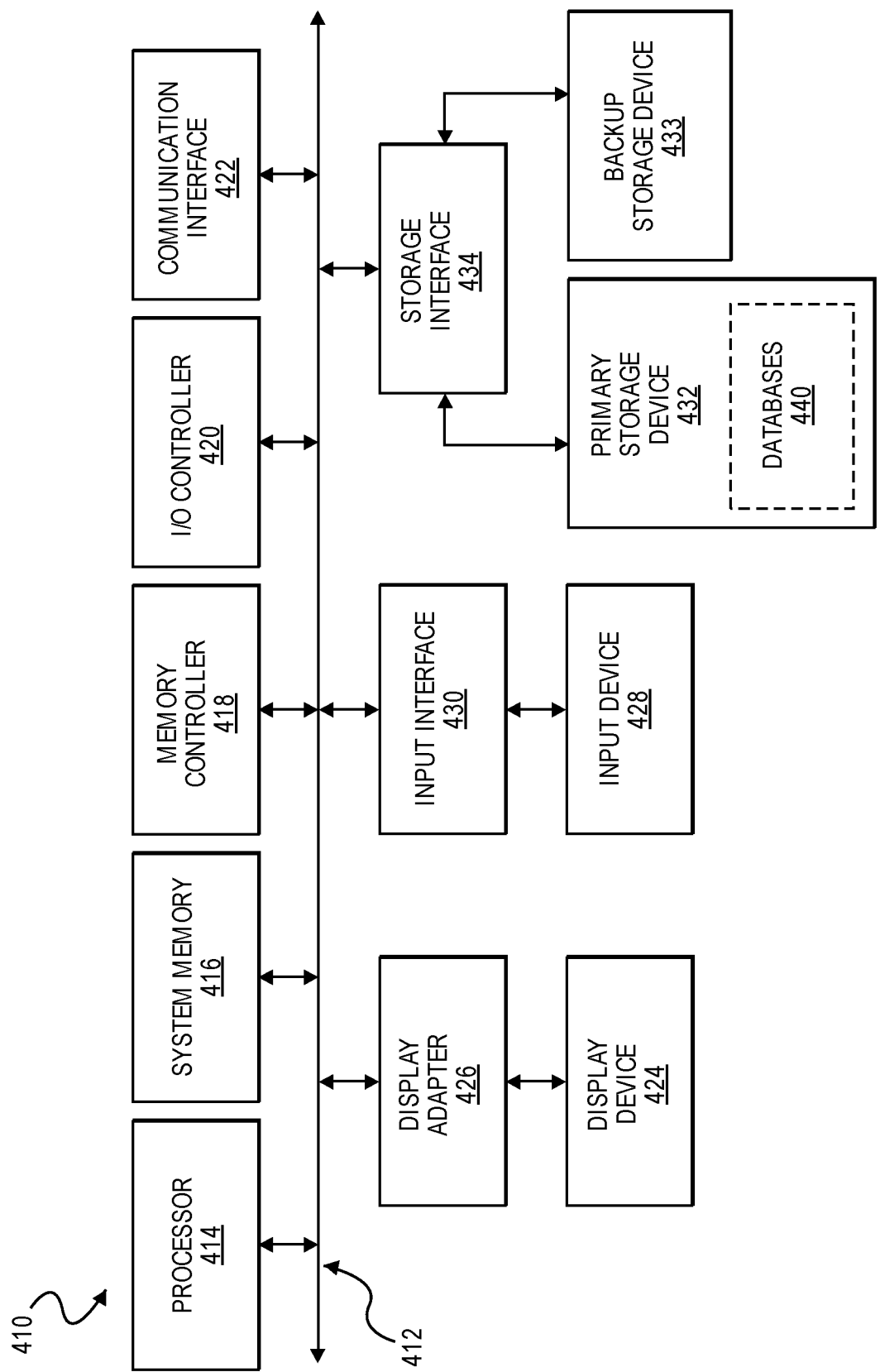
FIG. 4 is an exemplary computer system in accordance with embodiments of the present invention.

FIG. 4 is a block diagram of an example of a computing system 410 capable of being integrated with a processor 414 of an embodiment of the present disclosure. Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 of an embodiment of the present invention and a system memory 416.

Processor 414 incorporates embodiments of the present invention and generally represents any type or form of processing unit capable of processing data or interpreting and executing instructions. In certain embodiments, processor 414 may receive instructions from a software application or module. These instructions may cause processor 414 to perform the functions of one or more of the example embodiments described and/or illustrated herein. In one embodiment, processor 414 may be an out of order microprocessor. In a different embodiment, processor 414 may be a superscalar processor. In yet another embodiment, processor 414 may comprise multiple processors operating in parallel.

System memory 416 generally represents any type or form of volatile or non-volatile storage device or medium capable of storing data and/or other computer-readable instructions. Examples of system memory 416 include, without limitation, RAM, ROM, flash memory, or any other suitable memory device. Although not required, in certain embodiments computing system 410 may include both a volatile memory unit (such as, for example, system memory 416) and a non-volatile storage device (such as, for example, primary storage device 432).

Computing system 410 may also include one or more components or elements in addition to processor 414 and system memory 416. For example, in the embodiment of FIG. 4, computing system 410 includes a memory controller 418, an input/output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI Express (PCIe), or similar bus) and a network.

Memory controller 418 generally represents any type or form of device capable of handling memory or data or controlling communication between one or more components of computing system 410. For example, memory controller 418 may control communication between processor 414, system memory 416, and I/O controller 420 via communication infrastructure 412.

I/O controller 420 generally represents any type or form of module capable of coordinating and/or controlling the input and output functions of a computing device. For example, I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between example computing system 410 and one or more additional devices. For example, communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In one embodiment, communication interface 422 provides a direct connection to a remote server via a direct link to a network, such as the Internet. Communication interface 422 may also indirectly provide such a connection through any other suitable connection.

Communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data for display on display device 424.

As illustrated in FIG. 4, computing system 410 may also include at least one input device 428 coupled to communication infrastructure 412 via an input interface 430. Input device 428 generally represents any type or form of input device capable of providing input, either computer- or human-generated, to computing system 410. Examples of input device 428 include, without limitation, a keyboard, a pointing device, a speech recognition device, or any other input device.

As illustrated in FIG. 4, computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410.

In one example, databases 440 may be stored in primary storage device 432. Databases 440 may represent portions of a single database or computing device or it may represent multiple databases or computing devices. For example, databases 440 may represent (be stored on) a portion of computing system 410. Alternatively, databases 440 may represent (be stored on) one or more physically separate devices capable of being accessed by a computing device, such as computing system 410.

Continuing with reference to FIG. 4, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be separate devices accessed through other interface systems.

Many other devices or subsystems may be connected to computing system 410. Conversely, all of the components and devices illustrated in FIG. 4 need not be present to practice the embodiments described herein. The devices and subsystems referenced above may also be interconnected in different ways from that shown in FIG. 4. Computing system 410 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of the example embodiments described and/or illustrated herein. Additionally or alternatively, the example embodiments described and/or illustrated herein may be implemented in firmware and/or hardware.

Method and Apparatus for Predicting Forwarding of Data from a Store to a Load

Embodiments of the present invention provide a method and apparatus for a more efficient and flexible OOO processor architecture that is configured to prevent memory RAW delays. To reduce the performance and power costs associated with the retries resulting from a memory RAW delay, in one embodiment, the present invention prevents a load from being issued if a prior store, still in flight, is writing the data that load wants to read (store forwarding process).

In one embodiment, the present invention provides for a Load Store Alias Predictor (LSAP) module that can be used to prevent the issuing of a load until its forwarding store becomes ready by adding an artificial dependency from a load to its matching Store Data (SD) and delaying the load until the SD is issued. The memory dependence between the load and its forwarding store is made visible to the scheduler by explicitly forming a dependency link from the load to the store. By making the memory dependence between a load and its forwarding store visible to the scheduler, the LSAP targets both memory RAW violations and memory RAW delays.

The LSAP is advantageous because it results in better performance. Later instructions including other loads which do not have dependencies can be issued and benefit from a high level of instruction level parallelism. It also avoids the longer control path latency of retry which requires the LSQ to send a data ready signal to wake up all the instructions dependent and waiting on the aliasing load to resolve when the forwarding store becomes ready. Further, the LSAP advantageously saves power by reducing activities associated with retries and increases LSQ resource utilization efficiency.

Further, embodiments of the present invention provide a method and apparatus for a more efficient and flexible OOO processor architecture that prevents memory RAW violations by delaying the write back of a load until a forwarding store has forwarded the data that the load is expecting. This results in better performance because, unlike conventional OOO processors, in one embodiment, the OOO processor of the present invention will only delay the data from a potentially problematic load to wait for an aliasing store to forward data instead of waiting on all prior occurring stores.

To reduce the cost of repetitive RAW violations from certain load instructions, in one embodiment, the present invention provides for a Load Store Hazard Predictor (LSHP) module. The LSHP can advantageously identify loads that might cause RAW violations based on a prior history of failing to return data written by older stores in the programming order. Further, the LSHP also advantageously delays the loads only when it is necessary to avoid a RAW violation because not all instances associated with the same load instruction result in RAW violations.

Accordingly, both the LSAP and LSHP act in concert to allow for more aggressive memory speculation in an OOO processor while reducing the penalty of a mispredict. With the combination of LSAP and LSHP, the OOO microarchitecture of the present invention can achieve high performance with fewer memory mispredictions and faster store to load data forwarding.

Figure 5:
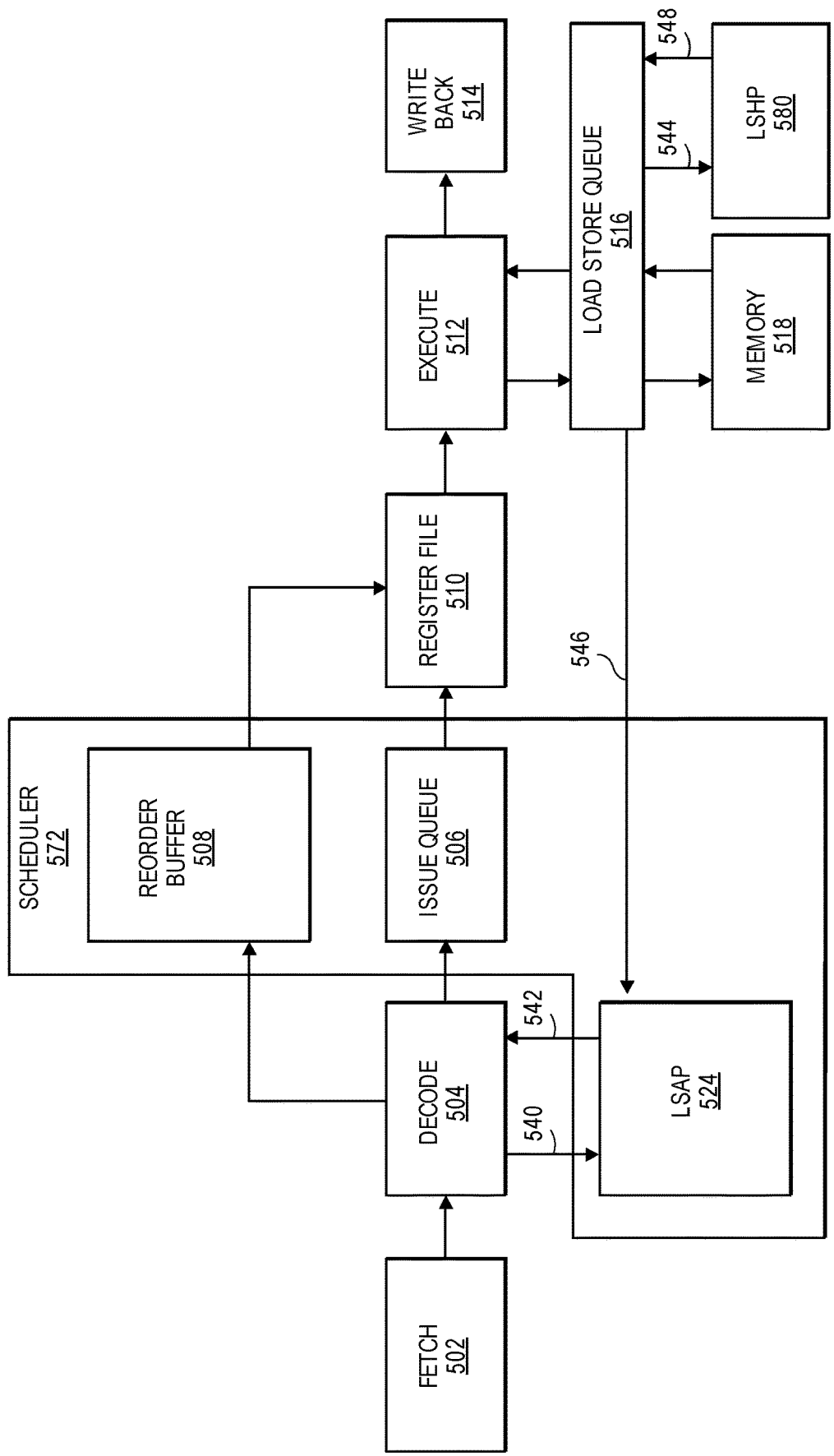
FIG. 5 is an exemplary diagram of a pipeline for an out of order microprocessor wherein the Load Store Alias Predictor gates the dispatch of load instructions at the scheduler stage and wherein the Load Store Hazard Predictor gates the data return of load instructions at the memory stage of the pipeline in accordance with one embodiment of the present invention.

FIG. 5 is an exemplary diagram of a pipeline for an out of order microprocessor wherein the Load Store Alias Predictor gates the dispatch of load instructions at the scheduler stage and wherein the Load Store Hazard Predictor gates the data return of load instructions at the memory stage of the pipeline in accordance with one embodiment of the present invention.

As illustrated in FIG. 5, instructions are fetched at the fetch stage 502 and placed in the instruction fetch queue (IFQ) (not shown) within the fetch stage 502. These instructions reference the architectural registers, which are stored in register file 510. After the instructions are dispatched from the fetch unit 502, they are decoded by decode module 504 and are placed in the ROB 508 and issue queue 506 (IQ). In one embodiment of the present invention, the scheduler module 572 comprises the ROB 508 and IQ 506. As instructions are issued out of IQ 506 out of order using scheduler module 572, they are executed by execute module 512.

In one embodiment, the write back module 514 will write the resulting values from those instructions back to the temporary registers in ROB 508 and rely on the ROB 508 to facilitate committing the instructions in order. However, in a different embodiment, write back module 514 writes the values resulting from instruction execution directly into register file 510 without sorting them. The unordered elements are added in physical memory to the register file 510 in an unordered fashion and are then retired to the architectural files in order at the retirement stage using a ROB initiated protocol.

When loads and stores are issued out of IQ 506 out of order, they can be placed in an available slot in the LSQ 516 to resolve any memory dependencies between them. The loads and stores in the LSQ 516 will access memory 518 to access or store data in memory respectively.

In the embodiment presented in FIG. 5, the LSAP 524 and LSHP 580 are two separate modules operating at two different stages of the pipeline. As will be explained further below, the LSAP can be configured at the scheduler stage to gate the issuing of loads to prevent dispatching till the respective forwarding stores are ready. Meanwhile, the LSHP 580 can be used at the memory stage of the pipeline to delay the data return from problematic loads until all respective possible stores have forwarded data. Stated differently, the write back of the loads are delayed until the corresponding stores have had time to forward their data directly to the respective loads.

Figure 6:
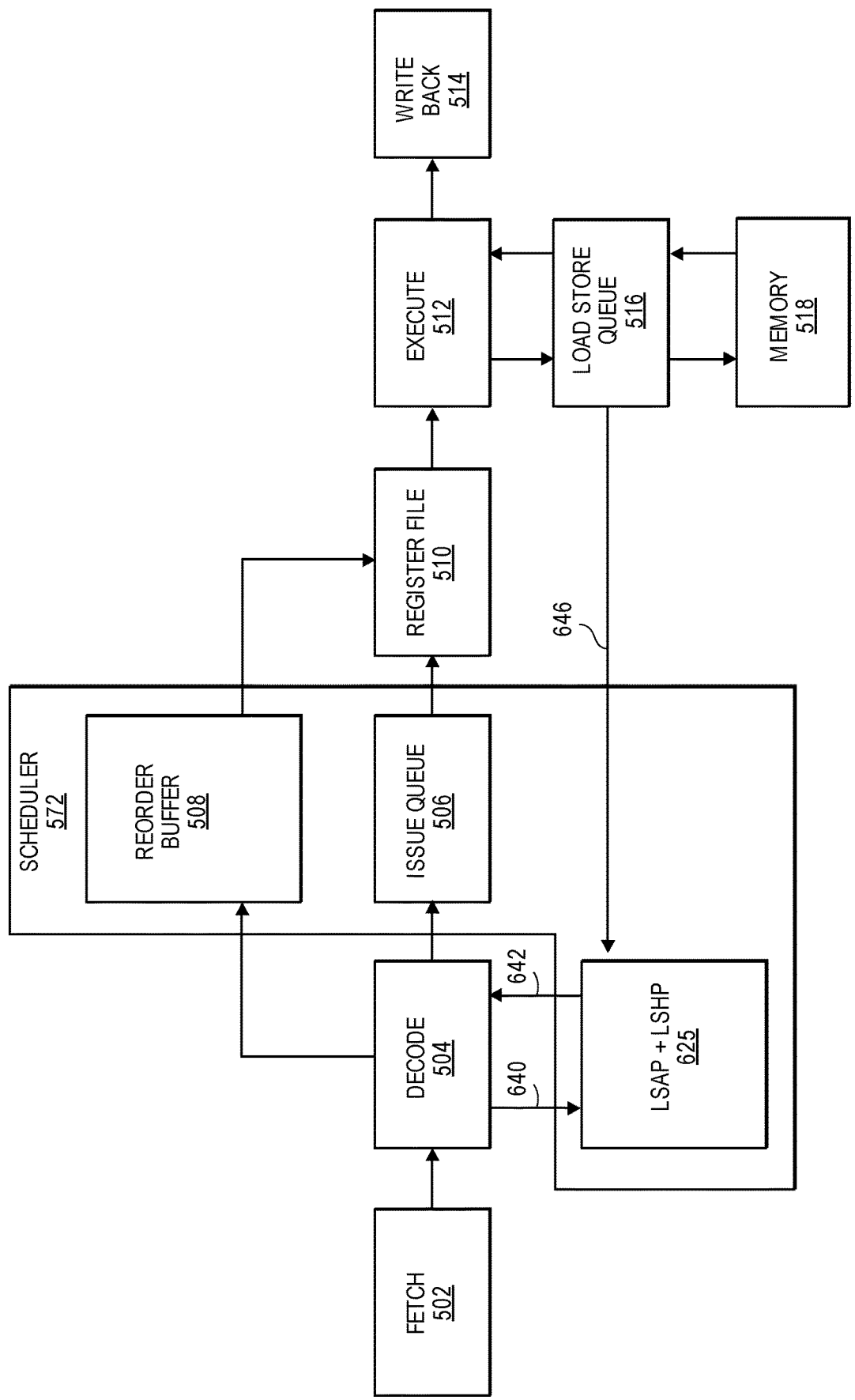
FIG. 6 is an exemplary diagram of a pipeline for an out of order microprocessor wherein both the Load Store Alias Predictor and the Load Store Hazard Predictor are integrated into one memory structure and deployed at the scheduler stage in accordance with one embodiment of the present invention.

FIG. 6 is an exemplary diagram of a pipeline for an out of order microprocessor wherein both the Load Store Alias Predictor and the Load Store Hazard Predictor are integrated into one memory structure and deployed at the scheduler stage in accordance with one embodiment of the present invention.

Similarly numbered elements within FIG. 6 perform essentially the same function as they do in FIG. 5. As shown in FIG. 6 and explained further below, both the LSAP and LSHP can be integrated within one module 625 that can be used to delay the dispatch of any potentially problematic loads till the store data (SD) from forwarding stores has issued. In one embodiment, both LSAP and LSHP can be dispensed at the scheduler stage to gate the dispatch of a load, but have their own individual memory structures.

The Load Store Alias Predictor ("LSAP")

FIG. 7 is an exemplary diagram of a Load Store Alias Predictor ("LSAP") in accordance with one embodiment of the present invention. As mentioned above, the LSAP gates the issuing of a load to prevent it from dispatching until its forwarding store becomes ready. It makes memory dependence between a load and its forwarding store visible to the scheduler by explicitly forming a dependency link from the load to the store. Accordingly, the load only needs to wait for the specific forwarding store to be executed instead of waiting on all loads. One of the advantages of the LSAP is that by creating a dependency between a load and its forwarding store, the LSAP can be used to target both memory RAW violations and memory RAW delays.

The prediction table used by the LSAP, as illustrated in FIG. 7, comprises a valid field 757, a tag field 758, a store delta field 759 (StoreDelta) and a confidence counter field 760 (ConfCount).

Each row of the prediction table records a load's prior history. The valid field indicates whether the row contains valid information. The tag field identifies the load. In one embodiment, the tag field can be a hash of the Program Counter (PC) value for the load instruction. The StoreDelta field records the distance of the load to the last store that writes to the same memory address that the load accesses. In one embodiment, this distance can be the Reorder Buffer Identifier (ROB Id) distance between a load and its forwarding store. Finally, the ConfCount field, as will be explained further below, indicates the strength of the prediction. In one embodiment, the ConfCount field indicates the number of times the outcome has matched the prediction generated by the LSAP concerning the dependency of the present load to its forwarding store. Accordingly, the higher the ConfCount value, the more reliable the prediction generated by the LSAP.

In one embodiment, the LSAP can comprise 16 fully associative entries employing a Least Recently Used (LRU) replacement policy. However, different embodiments can scale the number of entries and employ different replacement policies.

Referring now to FIG. 5, each instruction fetched from the Fetch Stage 502 will be assigned to ROB 508 after decoding in the Decode 504 pipeline stage. At this point, the PC of a fetched load instruction can be used to access LSAP through path 540. In one embodiment, the hash of the PC may be used to perform a look-up by comparing it with the tag field of the loads stored in the LSAP table. If the matching entry in the table meets certain conditions, the prediction results will be returned to the decode stage 504 through path 542 and stored in ROB 508.

The conditions that need to be met by the matching entry for the fetched load in the table before it can qualify as a valid prediction can vary for different embodiments. In one embodiment, in order for a matching entry to constitute an "LSAP_hit," ConfCount needs to be greater than or equal to a predetermined threshold and StoreDelta needs to be greater than zero. The threshold can be set as low as 1. In one embodiment, a 2-bit counter can be used to track the value of the ConfCount field so that it saturates at a value of 3. A maximum value of 3 may be high enough to indicate that the prediction is strong and that the corresponding load should be delayed.

If the conditions are met for an LSAP_hit, LSAP will return the corresponding StoreDelta from the matching entry in the table through path 542 to Decode module 504 and ROB 508. The value of StoreDelta can be used to generate the ROB Id of the aliasing store by subtracting it from the fetched load's ROB Id. Using the StoreDelta value, the Decode module 504 and ROB 508 can subsequently add a dependency between the fetched load and its aliasing store. Accordingly, the store instruction at the ROB Id calculated needs to be ready before this load can be dispatched from scheduler 572. In other words, the scheduler 572 is now aware of the dependence from the load to the previous store and, therefore, the load will only be dispatched and executed after the store has been executed.

Figure 8:
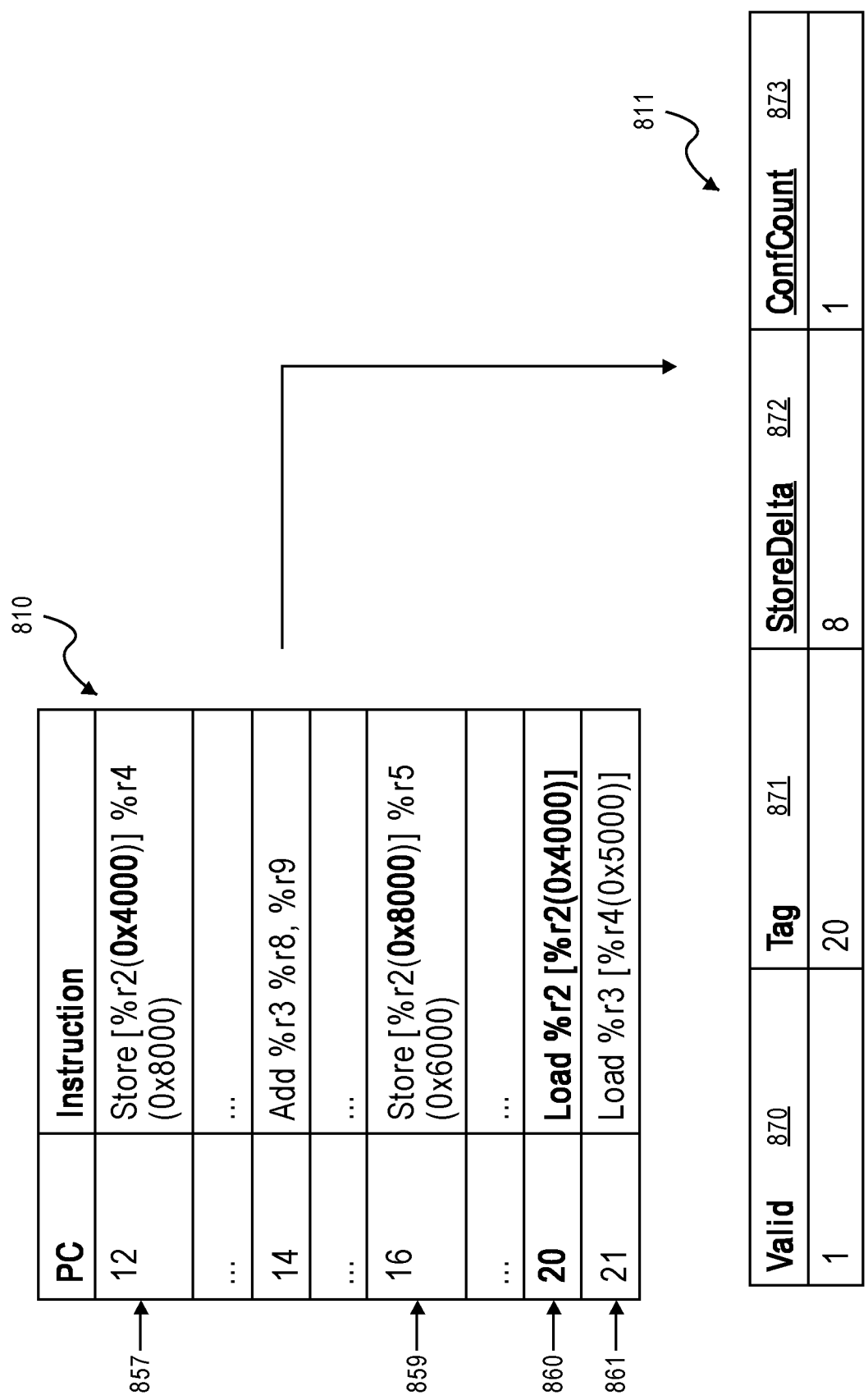
FIG. 8 illustrates a first exemplary update cycle for a LSAP in accordance with one embodiment of the present invention.
Figure 9:
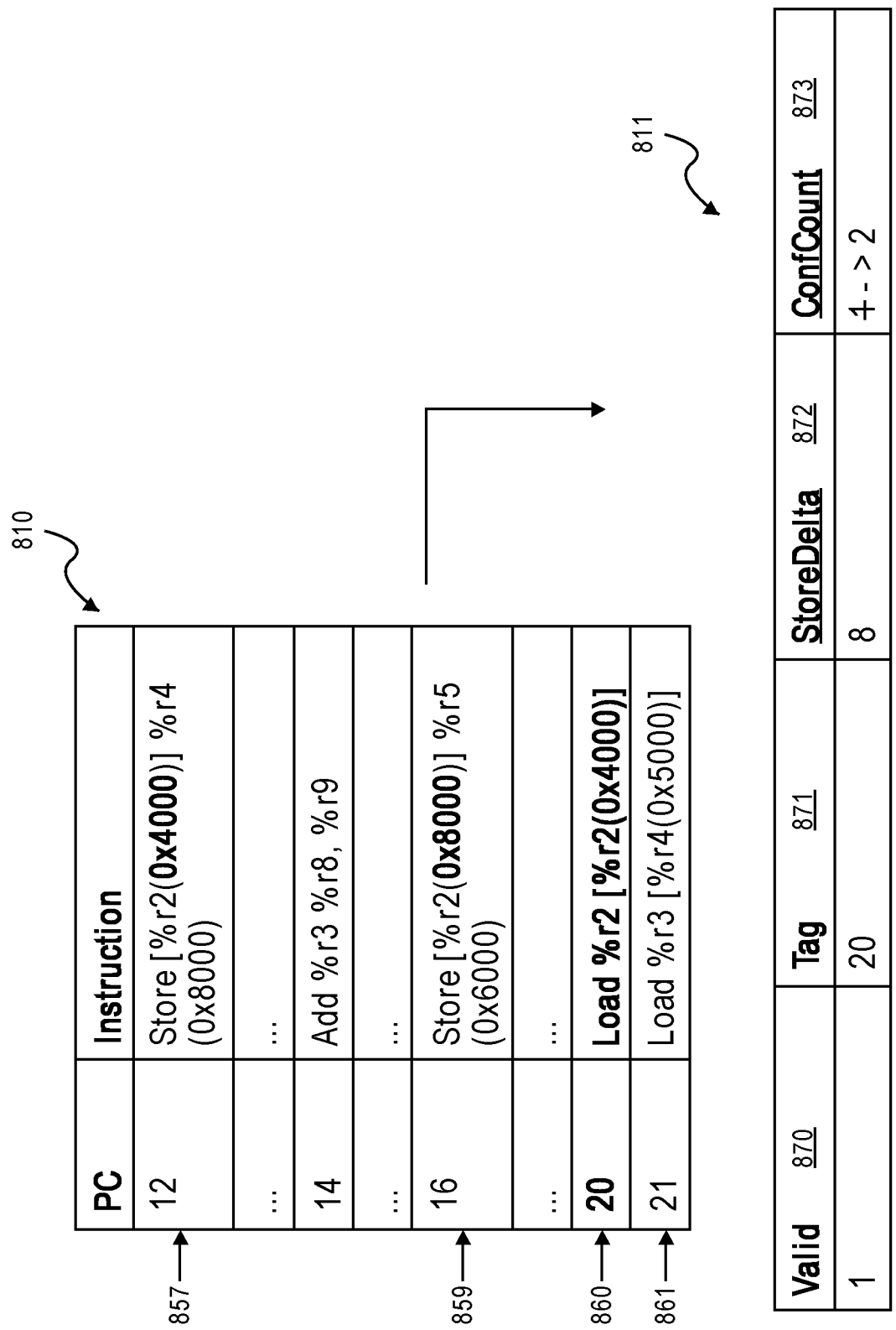
FIG. 9 illustrates a second exemplary update cycle for a LSAP in accordance with one embodiment of the present invention.
Figure 10:
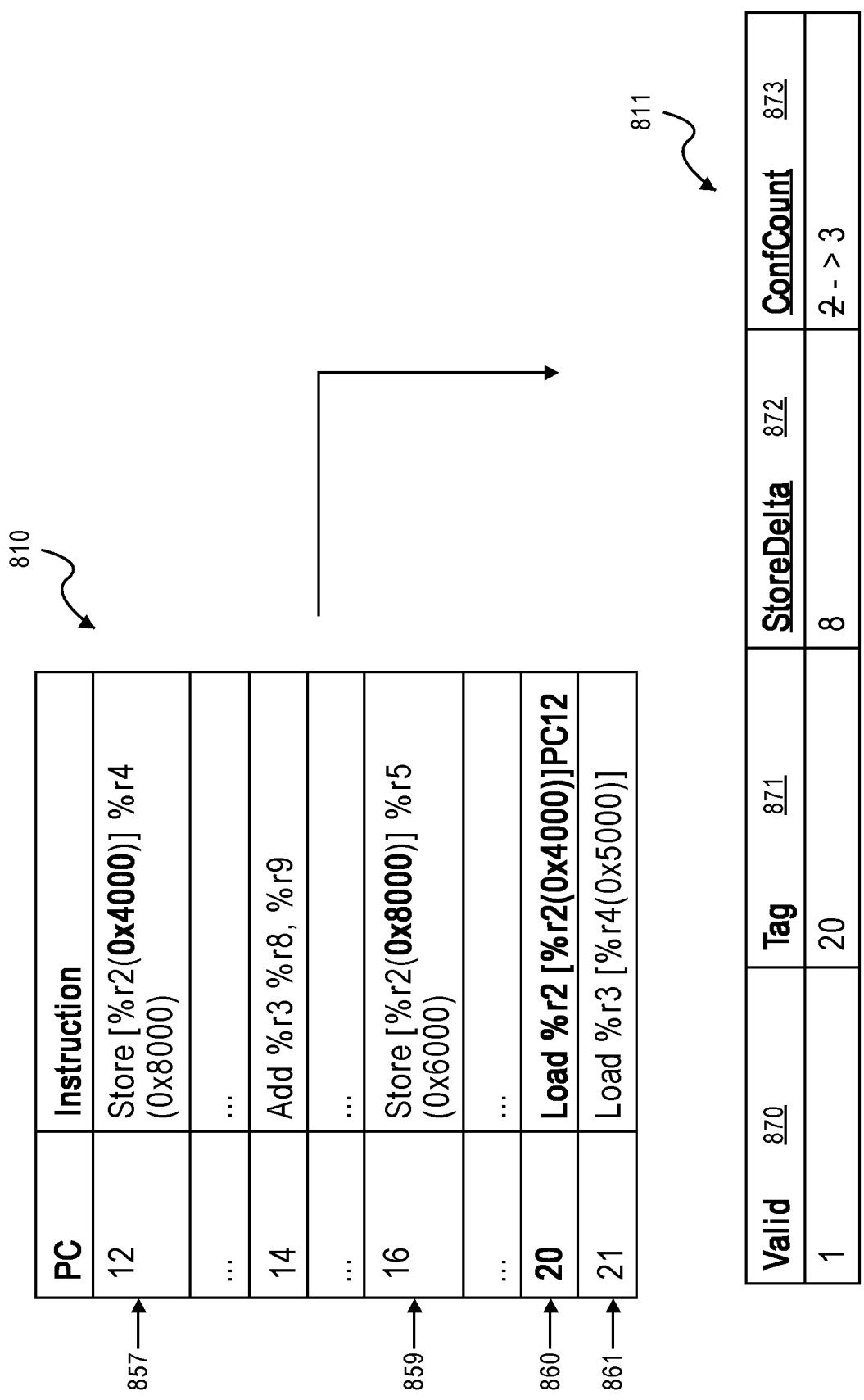
FIG. 10 illustrates a third exemplary update cycle for a LSAP in accordance with one embodiment of the present invention.

FIGS. 8 through 10 illustrate how the various fields in an LSAP are updated. FIG. 8 illustrates a first exemplary update cycle for a LSAP in accordance with one embodiment of the present invention. After instruction block 810, comprising instructions 857 (PC 12) through 861 (PC 21), is fetched by the fetch stage 502 for the first time, the instructions will be assigned to ROB 508 after decoding in the Decode 504 pipeline stage. The PC of fetched load instruction 860 may be used to find any matching entries in LSAP, however, because this is the first execution cycle for these instructions, no matching entries in LSAP will be found. Therefore, during the first execution cycle for a given load instruction at least, the LSAP will not be able to generate a valid prediction.

Two potential problems can occur with load instruction 860 as it is executed. First, a memory RAW violation could occur. Load instruction 860 could be dispatched and executed before store instruction 857 (PC 12), in which case it will load incorrect data because store instruction 857 will not have populated the correct data at memory address (0x4000). Second, a memory RAW delay could occur. The memory RAW delay problem is that the load instruction 860 may be dispatched and executed after the store, but the store is blocked by a different long latency operation (not shown). Thus, load 860 would end up being delayed and occupying memory resources, e.g., memory resources in the LSQ while it waits on store 857 to be ready.

It is important to note that store instruction 859 in FIG. 8 is not relevant to load instruction 860 because it stores data to a different memory address (0x8000). While a conventional OOO processor would have delayed load instruction 860 to wait for all prior stores including store 859, one of the advantages of the LSAP of the present invention is precisely that any potentially problematic load is able to selectively wait for only its aliasing store.

Either of the two problems, memory RAW violation or memory RAW delay is likely to occur during the first cycle illustrated in FIG. 8 because the LSAP cannot generate a valid prediction yet because it has no entries corresponding to instruction PC 20. Either load instruction 860 will need to re-execute because of a memory RAW violation or it will be delayed to get data from the store 857 at PC 12 as a result of a memory RAW delay. Accordingly, load instruction 21 may also be delayed because load instruction 860 is using up precious computational and memory resources. The LSAP of the present invention can prevent against both of those problems as will be shown in the subsequent cycles illustrated in FIGS. 9 and 10.

At the end of memory stage 518, the LSQ 516 updates LSAP 524 through path 546 to correct any stored prediction. In one embodiment, feedback is provided using the tag and StoreDelta information of a load only if the load either resulted in an LSAP_hit previously or if the load has been retried because it has data forwarded to it from a store. If the LSAP_hit bit is set, it means that the load is predicted to have dependency when the Decode stage 504 accesses LSAP. The LSAP_hit bit is then set in the scheduler 572 and passed along the pipeline to the LSQ. A load is also allowed to update LSAP if it has been retried due to store data forwarding. Normal data forwarding from a store without retrying and other types of retries will not trigger the update from the LSQ.

If no entry is found, a new entry will be added to LSAP using LRU replacement policy. The StoreDelta update, for example, can provide the distance from the load's ROB Id to the forwarding store's ROB Id. For load instruction 860 in FIG. 8, the StoreDelta will be 8, which is the difference between the PC (or ROB Id) for load 860 (20) and the PC (or ROB Id) for its aliasing store (12).

In the case of the first cycle, as represented in FIG. 8, a new entry will be added with the information regarding load instruction 860 because no entry pertaining to it is found in the LSAP. In one embodiment, the new entry can be added using LRU replacement policy. As shown in FIG. 8, LSAP 811 is updated with values for instruction 860. For example, the valid field 870 is set to 1, the tag field 871 receives the hash of the load's PC, the StoreDelta field receives a value of 8, and ConfCount is set to 1 as an initial value. ConfCount is set to a value of 1 because this is the first and only time this load has been encountered and, therefore, the LSAP prediction regarding its forwarding store may still be considered weak.

In one embodiment, in order to conserve write ports to the LSAP, only loads that have aliasing or predicted to have aliasing will be able to update the LSAP.

FIG. 9 illustrates a second exemplary update cycle for a LSAP in accordance with one embodiment of the present invention. Again, the PC of fetched load instruction 860 may be used to find any matching entries in LSAP. In this cycle, a match will be found in the LSAP for instruction 860 by searching for an entry with a tag value of 20.

Assuming the ConfCount threshold value is set to at least 2, however, no LSAP_hit is returned in this cycle either because ConfCount is still 1 and below the threshold value. As indicated above, a low ConfCount value means that the respective LSAP entry does not have high enough predictive integrity yet. As discussed above, in one embodiment, ConfCount needs to be greater than or equal to 2 to return an LSAP_hit. StoreDelta is, however, greater than zero, so the second criterion to return an LSAP_hit is met by the entry for instruction 860 in LSAP 811, which has a StoreDelta of 8. But because ConfCount is not greater than or equal to 2, no prediction is returned from the LSAP to the decode stage 504. Accordingly, the load 860, once again, goes through the pipeline causing a memory RAW violation or a memory RAW delay and needs to either be re-executed or delayed to get data from store 857 at PC 12. Further, instruction 861 at PC 21 is also delayed similar to the first cycle.

At the end of memory stage 518, the LSQ 516 again updates LSAP 524 through path 546. After the LSQ finds the entry in LSAP 811 corresponding with tag 20, it will compare the current store load distance with the recorded distance in StoreDelta field 872 in LSAP table 811. If there is a match, it indicates that the same store instruction 857 ended up forwarding data to load 860 as in the prior cycle. This increases the predictive integrity of the entry for instruction 860 in LSAP 811 and, accordingly, ConfCount field 873 will be increased by 1 to 2 as shown in FIG. 9. Conversely, if the current store load distance did not match with the value of StoreDelta in LSAP table 811, then the prediction would be less reliable and ConfCount would be decreased.

FIG. 10 illustrates a third exemplary update cycle for a LSAP in accordance with one embodiment of the present invention. Similar to the prior cycles, the PC of fetched load instruction 860 may be used to find any matching entries in LSAP. In this cycle, a match again will be found in the LSAP for instruction 860 by searching for an entry with a tag value of 20.

Assuming the ConfCount threshold value is set to at least 2, all the conditions for returning an LSAP_hit are now met. StoreDelta is greater than zero and ConfCount is greater than or equal to 2. Accordingly, when decode stage 504 attempts to access LSAP using path 540, a valid prediction is returned via path 542. Decode stage 504 and scheduler 572 receives the dependence information between load 860 and store 857. Specifically, the decode stage 504 is informed using StoreDelta that the load instruction with PC (or ROB Id) 20 is dependent on a store that is 8 instructions before it. The Decode stage 504 and scheduler 572 calculates the PC (or ROB Id) of the aliasing store at PC 12. Based on this information, scheduler 572 will refrain from dispatching load instruction 860 for execution until after store instruction 857 at PC 12 is executed. This avoids both a memory RAW violation and a memory RAW delay that may result from dispatching load 860 at the same time or earlier than store 857. Further, load instruction 861 at PC 21 now has the computational and memory resources to execute while the load 860 at PC 20 is waiting for the store 857 at PC 12.

At the end of the memory stage 518, the LSQ 516 again updates LSAP 524 through path 546. After the LSQ finds the entry in LSAP 524 corresponding with tag 20, it will compare the current store load distance with the recorded distance in StoreDelta field 872 in LSAP table 811. Since there will be a match in this case, ConfCount will be increased to a value of 3. In one embodiment, a 2-bit register is used to track ConfCount, and accordingly, ConfCount saturates at a value of 3. The prediction associated with the corresponding entry in the LSAP is considered to have high predictive integrity because ConfCount is at its maximum value.

In subsequent cycles, if the aliasing load 860 has a different StoreDelta than the one recorded in the LSAP, the StoreDelta value will remain unchanged if the ConfCount is greater than two. However, ConfCount may be decreased by a value of 1 to reflect the reduction in predictive integrity. Leaving the StoreDelta value unchanged prevents one incorrect update from invalidating a LSAP entry's StoreDelta value. Thus, for example, the impact of a wrong update from a branch mispredicted path is reduced.

As explained above, LSAP_hit is set when there is an instruction hit in LSAP that matches the predetermined conditions. However, a load may not be aliasing after it is installed into the LSAP. If the load is allowed to stay in the LSAP, it might cause performance degradation because it installs an incorrect dependency each time it is allocated by the scheduler. To prevent this, the LSQ 516 uses the LSAP_hit bit to force the load to send updates to LSAP even if there is no forwarding from a store. In this case, the StoreDelta is set to 0 and updates are sent to the LSAP until ConfCount is less than the threshold value. In one embodiment, when ConfCount is reduced to a value of 0, the entry can be removed from the LSAP. In another embodiment, the LSQ 516 can force the valid bit 757 of the corresponding load entry in the LSAP off and, thereby, preclude that entry from being used as a valid prediction anymore.

In summary, the LSAP addresses both memory RAW violations and memory RAW delays. It allows better performance for the OOO processor by allowing a high degree of instruction level parallelism. Accordingly, later instructions including other loads which do not have dependency problems can be issued without having to wait for a delayed load. Further, it avoids the longer control path latency of retry which requires the LSQ to wake up all the buffered instructions that are dependent on and waiting on the aliasing load. Finally, the LSAP results in saving power by reducing activities associated with retries and increasing LSQ resource utilization efficiency.

The Load Store Hazard Predictor ("LSHP")

Not all store-to-load data forwarding pairs can be captured by the above-described LSAP. The scheduler issues loads and stores once all source operands become ready. For any incoming stores, a load queue is searched for all later loads in the programming order with the same memory address. If a matching load has already returned data to execution, a memory RAW violation is identified and all instructions starting from this load will be flushed and re-executed. This is because the load returned data (or performed write back of the data) prematurely before it received the correct data from its forwarding store.

To reduce the cost of repetitive RAW violations from certain load instructions, embodiments of the present invention provide for a Load Store Hazard Predictor ("LSHP") table that is operable to delay the data from the problematic loads until all possible corresponding stores have physically forwarded data to the respective loads. As discussed above, the LSHP can advantageously identify loads that might cause RAW violations based on a prior history of failing to return data written by older stores in the programming order. Further, the LSHP also advantageously delays the loads only when it is necessary to avoid a RAW violation because not all instances associated with the same load instruction result in RAW violations.

As demonstrated in FIG. 5, both the LSAP and LSHP provide predictions related to a load instruction in the pipeline. In the embodiment of the present invention illustrated in FIG. 5, the LSAP 524 and LSHP 580 exist as separate modules. The difference between the LSAP 524 and LSHP 580 in the embodiment presented in FIG. 5 is that the LSAP reduces the latency when a load instruction needs to wait for a forwarding store's Store Data (SD) to be issued by gating the dispatch of the load at the scheduler stage. The objective of the gating is to prevent the dispatch of the load until the corresponding forwarding store has executed. By comparison the LSHP 580 avoids the machine pipeline flushes caused by wrong data returned by a load that executes prior to its aliasing store.

Additionally, as compared to the LSHP that only deals with memory RAW violations in the embodiment of FIG. 5, the LSAP can address both memory RAW violations and memory RAW delays. Because the LSAP is located at the scheduler stage 572, it can gate loads prior to their dispatch and, thus, it can delay loads till their forwarding stores have executed. This prevents memory RAW delay by making sure that a store instruction has executed with all its operands before its aliasing load is dispatched. The LSHP, by comparison, has no control over the dispatch of instructions and, therefore, has no control over memory RAW delays. It can, however, be used to capture the store-to-load data forwarding pairs that were not caught by the LSAP at the scheduler stage. The LSHP is used in the memory stage 518 to identify a load with a history of memory RAW violation and delay the data return of the load till its forwarding store has finished executing.

In regards to the embodiment illustrated in FIG. 5, the LSAP is updated for all load instructions to avoid a memory RAW delay or memory RAW violations by preventing dispatch of potentially problematic loads from the scheduler. By comparison, the LSHP is only updated when there is a memory RAW violation at the memory stage and a corresponding flush of the pipeline is required. Thus, the LSHP will have entries for load instructions that are known to cause RAW violations.

As indicated above, in one embodiment, such as the one illustrated in FIG. 6, both the LSAP and LSHP can be combined into one module that is operable to gate the dispatch of a load. The functionality to capture all the store-to-load data forwarding pairs, including the ones that are missed by the LSAP 525 of FIG. 5, is built into a single module. Instead of delaying the data return of loads at the memory stage, however, the combined LSAP and LSHP module simply prevent the dispatch of any load until its forwarding store has all its operands and has executed.

Figures 11A, 11B:
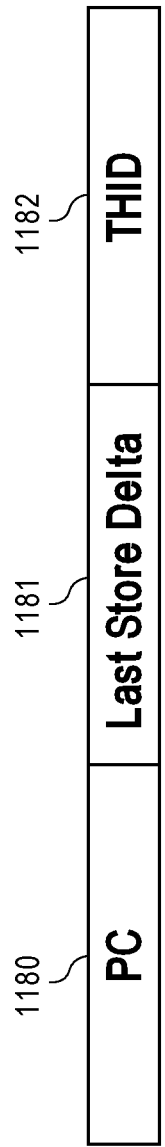
FIG. 11A is an exemplary diagram of a Load Store Hazard Predictor ("LSHP") in accordance with one embodiment of the present invention.
FIG. 11B is an exemplary diagram of a Composite Tag for a LSHP in accordance with one embodiment of the present invention.

FIG. 11A is an exemplary diagram of a Load Store Hazard Predictor ("LSHP") in accordance with one embodiment of the present invention. The prediction table used by the LSHP, as illustrated in FIG. 11A, comprises a valid field 1171, a composite tag field 1172, a store delta field 1173 (StoreDelta) and a confidence counter field 1174 (ConfCount).

Similar to the LSAP, each row of the LSHP prediction table records a load's prior history. The structure of both the LSAP and LSHP tables is similar; the LSHP, however, uses a different tag than the LSAP. FIG. 11B is an exemplary diagram of a Composite Tag for a LSHP in accordance with one embodiment of the present invention. The Composite Tag 1172 of an LSHP table comprises the PC of the load instruction 1180, the last store delta 1181, and thread ID (THID) 1182. The Last Store Delta (LSD) is the difference between a load's ROB Id to the nearest previous store's ROB Id. Finally, the THID is the thread identifier of the load instruction. As will be explained further below in reference to FIGS. 12 and 13, composite tag 1172 is used to be able to differentiate the same load on different execution paths to avoid unnecessary delays.

The valid field 1171 tracks if the prediction is valid. The StoreDelta field 1173, similar to the LSAP table, provides the distance to the last store accessing the same address as the load. The StoreDelta parameter 1173 helps reduce the delaying of a load by recording the store from which the load should get data forwarded using the distance between the store and load instructions.

Finally, similar to the LSAP table, ConfCount 1174 is a prediction confidence counter used to reduce update error by filtering out erroneous updates. As will be discussed further below, the ConfCount parameter helps to reduce the impact of updates from wrong branch prediction paths. The ConfCount is increased when a load gets data forwarded from a store at the recorded StoreDelta value. It is decreased when the load gets data forwarded from another store or has no data forwarded at all. Accordingly, the ConfCount keeps track of the predictive integrity of the LSHP entry.

Also, similar to the LSAP table, a threshold value is used to determine if the prediction is valid. In one embodiment, a prediction is considered valid if ConfCount is greater than 1. If ConfCount is not at least 1, the load will not be delayed. ConfCount can also be configured to use a 2-bit counter and saturate at a value of 3. If there is a misprediction that causes a wrong update when ConfCount is at a value of 3, the ConfCount value may be decreased to 2, however, the next lookup will still be delayed in accordance with the corresponding LSHP entry for the load because the ConfCount value is still greater than 1. The reason for using a 2-bit counter is to avoid the prediction being flipped because of a single misprediction, which often happens on a mispredicted path.

In one embodiment, the LSHP can comprise 16 fully associative entries employing a Least Recently Used (LRU) replacement policy. However, different embodiments can scale the number of entries and employ different replacement policies.

Figure 12:
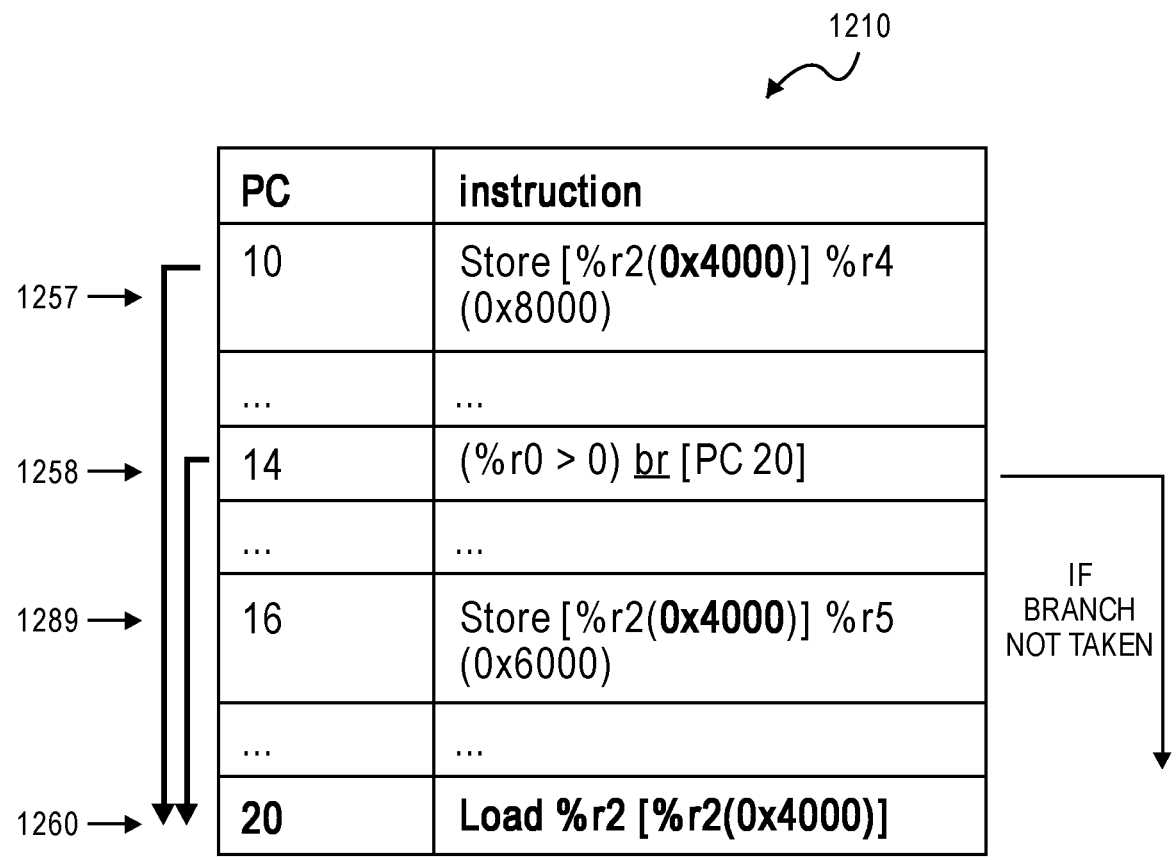
FIG. 12 illustrates how the composite tag is used in a LSHP in accordance with one embodiment of the present invention.

FIG. 12 illustrates how the composite tag is used in a LSHP in accordance with one embodiment of the present invention. As shown in FIG. 12, both store instructions 1257 (PC 10) and 1259 (PC 16) are aliasing with respect to load instruction 1260 (PC 20). Accordingly, PC 20 has two possible data sources, PC 10 or PC 16. If the branch at instruction 1258 (PC 14) is taken, then PC 16 is bypassed. In this case, the Last Store Delta parameter 1181 in composite tag 1172 will be the difference between the ROB Id (or PC) of PC 20 and PC 10 (20−10=10). Accordingly, the composite tag for load instruction 1260 if branch 1258 is taken will be 20:10. Note that for purposes of this example the thread identifier is ignored.

If, however, branch 1258 is not taken, then Last Store Delta parameter 1181 will be equal to the difference between the ROB Id (or PC) of PC 20 and PC 16. Accordingly, the composite tag for load instruction 1260 if branch 1258 is not taken will be 20:4. Load instruction 1260 can, therefore, potentially have two separate entries in the LSHP table, each entry corresponding to a different execution path. Or, for example, load instruction 1260 can only have one entry in the LSHP for the path that results in a RAW violation. In the example illustrated in FIG. 12, if a RAW violation is caused only when branch 1258 is not taken, only an entry for tag 20:4 is stored in the LSHP table. The execution for the branch taken path for load instruction 1260 with tag 20:10 is not delayed.

In summary, the reason for using Last Store Delta as part of the tag is because a load can be reached through more than one control path and most likely only one path will cause a RAW violation. Because the nearest store's location is unlikely to be the same in a different path, in one embodiment of the present invention, the Last Store Delta can be used as part of the tag to differentiate between them.

FIG. 13 illustrates how the StoreDelta parameter is used in conjunction with the composite tag parameter in a LSHP in accordance with one embodiment of the present invention. The load instruction 1360 (PC 20) has only one possible data source in FIG. 13, which is store instruction 1357 (PC 10) because it stores data at the same memory address (0x4000) that load instruction 1360 accesses. Accordingly, StoreDelta is 10 (PC 20−PC 10=10). However, the Last Store Delta parameter is calculated using load instruction 1360 (PC 20) and store instruction 1359 (PC 16) because the Last Store Delta parameter is agnostic to the memory address that the store instruction accesses. The main function of the Last Store Delta parameter is to be able to differentiate between different execution paths for the same load so as not to penalize a particular execution path that does not cause a memory RAW violation. Accordingly, Last Store Delta will be 4 (PC 20−PC 16=4) and the composite tag value for load instruction 1360 is determined to be 20:4. If load instruction 1360 were to cause a RAW violation, its corresponding entry would be stored in the LSHP with a tag of 20:4 and a StoreDelta of 10. Thus, the present invention advantageously differentiates between different execution paths for the same load so as not to penalize one particular path if it does not result in a RAW violation or mispredict.

One advantage of using an LSHP is that they help reduce the unnecessary delaying of loads that are known to cause RAW violations. As discussed above, conventional machines simply delay a load until all stores prior to it have executed. For example, a conventional machine would have delayed load instruction 1360 until both stores 1357 and 1359 had executed. However, this results in an unnecessary delay because store 1359 does not cause the RAW violation; it accesses a different memory address (0x8000) from load 1360 (0x4000).

In one embodiment of the present invention, load 1360 is freed up for execution once it gets data forwarded from store 1357 (PC 10). The present invention, in one embodiment, keeps track of all the stores dispatched by using a Store Address Dispatched ROB Id (SAD_ID) signal. The SAD_ID signal is sent from the scheduler 572 to the memory stage 518 to indicate the location for the oldest store that has not been issued. A conventional OOO processor would, for example, delay committing PC 20 till PC 16, the last store, has passed. Using embodiments of the present invention, this delay is reduced because when SAD_ID is greater than PC 10, the load PC 20 is not delayed any longer and can be committed because the correct data can be forwarded to it from PC 10. If SAD_ID is less than PC 10 however, the load is stalled.

Further, if the load PC 20 already has data forwarded to it from Store PC 10, the load will not be delayed regardless of SAD_ID. When a load enters memory stage, it searches all the stores that have been executed in the LSQ 516, and attempts to find the youngest store to the same address. If the load PC 20 in FIG. 12 finds store PC 10, it can get data from PC 10. A Current_Delta signal is used by the memory stage 518 to determine the delta between the ROB Id (or PC) of the load instruction and its forwarding store. If the load PC 20 gets data forwarded from Store PC 10 and Current_Delta (10) is equal to StoreDelta (10), then load PC 20 already has the correct data from store PC 10, and load PC 20 is not delayed any longer regardless of SAD_ID.

Referring now to FIG. 5, in one embodiment, when a load arrives at the LSQ 516 at the beginning of the memory stage, LSHP 580 is accessed with composite tag 1172 through path 544. For any matching entry for composite tag 1172 found in LSHP 580, a valid StoreDelta 1173 is returned through path 548 if ConfCount is greater than or equal to 1 and StoreDelta is greater than 0. The value of StoreDelta is then compared with the distance from the forwarding store to this load. If the distance matches, which indicates this load has already set up memory dependence from the predicted forwarding store, no RAW hazard will be signaled. Also if the load does not have any uncommitted previous store at the time of issue, this load will not trigger a memory RAW hazard. On the other hand, if there is no forwarding found or the StoreDelta distance does not match, this load will be a potential RAW hazard.

In one embodiment, immediately after a RAW violation, the load will be fetched and executed again. If older stores prior to the load are removed from the store queue after writing to the memory cache, the load should not be delayed. This is identified by using the oldest SAD_ID broadcasted from the scheduler 572. If the SAD_ID signal has passed forwarding store's ROB Id, the load will not be delayed as discussed above.

In one embodiment, if LSHP 580 is accessed and no matching entry is found for a load that is a potential RAW hazard, a new entry will be added to LSHP table with the appropriate tag. The StoreDelta will record the distance between the last aliasing store and the offending load. This information will be used later on for an incoming load to prevent LSHP from raising unnecessary RAW hazards if the load has already found the last aliasing store in the store queue. The ConfCount is set to 1 as an initial value to that the next load with the same composite tag will be flagged.

Subsequently, if an entry with the same composite tag 1172 is found in the LSHP, the current store load distance is compared with the recorded distance in StoreDelta for the matching entry. If there is a match, the ConfCount 1174 will be increased by one, otherwise it will be decreased by one. The associated entry is invalidated when the ConfCount value drops to zero.

The LSHP may periodically require a prediction correction. A load can be predicted as a RAW but not depend on the store specified by the StoreDelta. The load will be delayed until SAD_ID is greater than the youngest previous store. After this point no more stores can forward data to the load. ConfCount is decreased by 1 and if ConfCount is equal to zero, the corrected StoreDelta (0 if no store) will be used to update the LSHP entry associated with this load. Note that on a mismatch, StoreDelta is updated with a new store load distance (StoreDelta) only if ConfCount is zero.

Further, only loads flagged as RAW hazards will need to update LSHP. In order to remove zero confidence entries from LSHP quicker than the LRU policy allows for, the entries can simply be invalidated when the confidence level drops to zero.

Finally, as discussed above, the LSHP and LSAP, in the embodiment illustrated in FIG. 6, can both be combined into one module that is used to gate the dispatch of the load at the scheduler 572 stage. The fields for both tables, as shown in FIGS. 7 and 11A, are substantially similar. The composite tag 1172 of the LSHP table in FIG. 11A can be used to identify loads because, as discussed above, the Last Store Delta field 1181 of the composite tag helps to differentiate between the different control paths and clearly identify the control path that may result in a RAW violation. Instead of being used at the memory stage to delay the data return of the load, the LSHP is used in concert with the LSAP to block the issue of problematic loads from the scheduler 572.

In one embodiment, in addition to the combined LSAP+LHSP module 625 at the scheduler stage 572, another LSHP module can also be added at the memory stage, similar to LSHP module 580, in order to catch any stray loads that result in memory RAW violations that were not caught by module 625.

In summary, both the LSAP and LSHP act in concert to allow for more aggressive memory speculation in an OOO processor while reducing the penalty of a mispredict. With the combination of LSAP and LSHP, the OOO microarchitecture of the present invention can achieve high performance with fewer memory mispredictions and faster store to load data forwarding.

Figure 14:
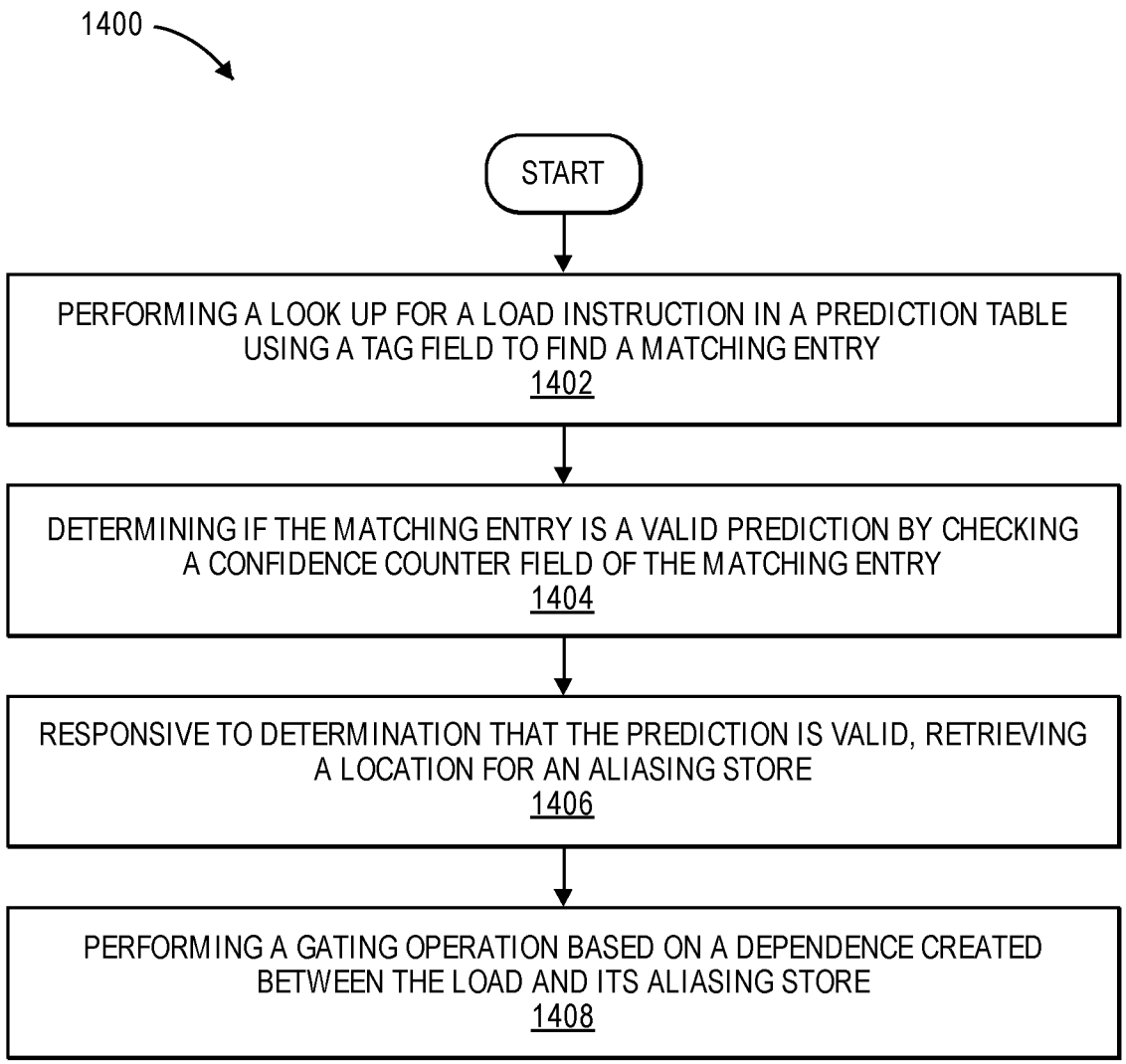
FIG. 14 depicts a flowchart for an exemplary computer controlled process for gating a load operation based on entries of a memory resident data structure in an out-of-order micro-architecture in accordance with embodiments of the present invention.

FIG. 14 depicts a flowchart 1400 for an exemplary computer controlled process for gating a load operation based on entries of a memory resident data structure in an out-of-order micro-architecture in accordance with embodiments of the present invention. While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 14 should not be construed as limiting the scope of the invention. Rather, it will be apparent to persons skilled in the relevant art(s) from the teachings provided herein that other functional flows are within the scope and spirit of the present invention. Flowchart 1400 may be described with continued reference to exemplary embodiments described above, though the method is not limited to those embodiments.

At step 1402, a look up is performed for a load instruction to find a matching entry using a tag field, e.g., tag 758 or composite tag 1172, in the memory resident data structure, wherein the data structure is a prediction table. The prediction table, as discussed above, can either be the LSAP 524, LSHP 580 or a combination module 625.

At step 1404, the confidence counter field of the matching entry is checked to determine if the matching entry constitutes a valid prediction.

At step 1406, responsive to a determination that the prediction is valid, the prediction table is accessed to retrieve a location for an aliasing store for the load. As discussed above, in one embodiment, the predicted location information can be in the form of a StoreDelta value that can be used to generate the ROB Id of the aliasing store by subtracting it from the fetched load's ROB Id.

Finally, at step 1408, a gating operation is performed based on a dependence established between the predicted aliasing store and the load. In one embodiment, the gating operation prevents the dispatching of the load, e.g., preventing the dispatch of the load from scheduler 572 using the LSAP 524 or the LSAP and LSHP combination module 625 as discussed previously. In a different embodiment, the gating delays the data return of the load using the LSHP module 580 as discussed above.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. An apparatus for gating a load instruction, said apparatus comprising:
a memory to store a prediction table comprising a plurality of entries including a matching entry matching said load instruction, wherein said matching entry comprises:
a tag field to identify said load instruction,
a distance field to indicate a distance of said load instruction to a prior aliasing store instruction, and
a confidence field to indicate a prediction strength;
a gating circuit operable to:
perform a look-up for said load instruction in said prediction table to find said matching entry,
determine if said matching entry provides a valid prediction by comparing a value of said confidence field of said matching entry with a threshold value,
responsive to a determination of a valid prediction, retrieve a location of said prior aliasing store instruction using a value of said distance field of said matching entry, and
perform a gating operation on said load instruction, wherein said gating operation prevents dispatching of said load instruction; and
a load store queue operable to provide feedback for updating said matching entry after said load instruction has executed, wherein said feedback is provided responsive to a determination that said matching entry provided a valid prediction and a determination that there is no forwarding to said load instruction from any store instruction, wherein said determination that said matching entry provided a valid prediction is made based on a hit indicator passed along a microprocessor pipeline to said load store queue, and wherein said feedback comprises distance information that indicates that there is no forwarding to said load instruction from any store instruction.

2. The apparatus of claim 1, wherein said prediction table is instantiated within a scheduler of said microprocessor pipeline.

3. The apparatus of claim 1, wherein said feedback is provided from a memory stage of said microprocessor pipeline.

4. The apparatus of claim 1, wherein said gating operation prevents dispatching of said load instruction until said prior aliasing store instruction has executed.

5. The apparatus of claim 1, wherein said gating circuit is further operable to increment the value of said confidence field of said matching entry responsive to a determination that values of said tag field and said distance field of said matching entry match tag and distance information of said load instruction.

6. The apparatus of claim 1, wherein said gating circuit is further configured to decrement the value of said confidence field of said matching entry in response to a determination that values of said tag field and said distance field of said matching entry do not match tag and distance information of said load instruction.

7. The apparatus of claim 1, wherein a value of said tag field is generated using a Program Counter (PC) value of said load instruction.

8. The apparatus of claim 1, wherein said value of said distance field is calculated by subtracting a Reorder Buffer Identification of said prior aliasing store instruction from a Reorder Buffer Identification of said load instruction.

9. The apparatus of claim 1, further comprising:
a second gating circuit operable to:
perform a look-up for a second load instruction in a second prediction table to find a second matching entry matching said second load instruction, wherein said second matching entry indicates a location of a second prior aliasing store instruction; and
perform a second gating operation on said second load instruction using information from said second matching entry, wherein said second gating operation delays a data return of said second load instruction until said second prior aliasing store instruction forwards data to said second load instruction.

10. A set of one or more non-transitory computer readable storage media storing instructions, which when executed by a microprocessor, causes said microprocessor to perform operations for gating a load instruction, said operations comprising:
performing a look-up for said load instruction in a prediction table to find a matching entry, wherein said matching entry comprises:
a tag field to identify said load instruction,
a distance field to indicate a distance of said load instruction to a prior aliasing store instruction, and
a confidence field to indicate a prediction strength;
determining if said matching entry provides a valid prediction by comparing a value of said confidence field with a threshold value;
responsive to a determination of a valid prediction, retrieving a location of said prior aliasing store instruction using a value of said distance field; and
performing a gating operation on said load instruction, wherein said gating operation prevents dispatching of said load instruction; and
updating said matching entry after said load instruction has executed by providing feedback from a load store queue responsive to a determination that said matching entry provided a valid prediction and a determination that there is no forwarding to said load instruction from any store instruction, wherein said determination that said matching entry provided a valid prediction is made based on a hit indicator passed along a microprocessor pipeline to said load store queue, and wherein said feedback includes distance information that indicates that there is no forwarding to said load instruction from any store instruction.

11. The set of one or more non-transitory computer readable storage media of claim 10, wherein said performing a look-up, said determining if said matching entry provides a valid prediction, said retrieving a location of said prior aliasing store instruction, and said performing a gating operation are executed within a scheduler of said microprocessor pipeline.

12. The set of one or more non-transitory computer readable storage media of claim 10, wherein said gating operation prevents dispatching of said load instruction until said prior aliasing store instruction has executed.

13. The set of one or more non-transitory computer readable storage media of claim 10, wherein said feedback is provided from said load store queue in a memory stage of said microprocessor pipeline.

14. The set of one or more non-transitory computer readable storage media of claim 10, wherein said operations further comprise:

incrementing the value of said confidence field of said matching entry in response to a determination that values of said tag field and said distance field of said matching entry match tag and distance information of said load instruction.

15. The set of one or more non-transitory computer readable storage media of claim 10, wherein said operations further comprise:
decrementing the value of said confidence field of said matching entry in response to a determination that values of said tag field and said distance field of said matching entry do not match tag and distance information of said load instruction.

16. The set of one or more non-transitory computer readable storage media of claim 10, wherein a value of said tag field is generated using a Program Counter (PC) value of said load instruction.

17. The set of one or more non-transitory computer readable storage media of claim 10, wherein said value of said distance field is calculated by subtracting a Reorder Buffer Identification of said prior aliasing store instruction from a Reorder Buffer Identification of said load instruction.

18. The set of one or more non-transitory computer readable storage claim 10, wherein said operations further comprise:
performing a look-up for a second load instruction in a second prediction table to find a second matching entry matching said second load instruction, wherein said second matching entry indicates a location of a second prior aliasing store instruction; and
performing a second gating operation on said second load instruction using information from said second matching entry, wherein said second gating operation delays a data return of said second load instruction until said second prior aliasing store instruction forwards data to said second load instruction.

19. A set of one or more non-transitory computer readable storage media storing instructions, which when executed by a microprocessor, causes said microprocessor to perform operations for gating a load instruction, said operations comprising:
performing a look-up for said load instruction in a prediction table to find a matching entry, wherein said matching entry comprises:
a composite tag field to identify said matching entry in said prediction table, wherein a value of said composite tag field is generated using a Program Counter (PC) value of said load instruction, a thread identifier, and a distance of said load instruction to a most recent prior store instruction on a control path leading to said load instruction,
a distance field to indicate a distance of said load instruction to a prior aliasing store instruction, and
a confidence field to indicate a prediction strength;
determining if said matching entry provides a valid prediction by comparing a value of said confidence field with a threshold value;
responsive to a determination of a valid prediction, retrieving a location of said prior aliasing store instruction using a value of said distance field; and
performing a gating operation on said load instruction, wherein said gating operation delays a data return of said load instruction until said prior aliasing store instruction forwards data to said load instruction.

20. The set of one or more non-transitory computer readable storage media of claim 19, wherein said operations further comprise:
incrementing the value of said confidence field of said matching entry in response to a determination that values of said composite tag field and said distance field of said matching entry match tag and distance information of said load instruction.

* * * * *